United States Patent [19]

Kikuchi et al.

[11] 3,994,607

[45] Nov. 30, 1976

[54] CONNECTOR FOR FIBER REINFORCED PLASTIC WIRE

[75] Inventors: Koji Kikuchi; Hiroshi Suzuki; Toshio Nomura, all of Yokohama, Japan

[73] Assignee: The Furukawa Electric Co., Ltd., Tokyo, Japan

[22] Filed: Sept. 11, 1974

[21] Appl. No.: 505,068

[52] U.S. Cl. .............................. 403/284; 403/300
[51] Int. Cl.² ...................... B25G 3/00; F16B 7/18; F16D 1/00; F16L 3/00
[58] Field of Search .......... 403/284, 285, 274, 212, 403/275, 268, 241, 300, 303, 305; 52/230, DIG. 7

[56] References Cited
UNITED STATES PATENTS

| | | |
|---|---|---|
| 1,321,264 | 11/1919 | Wagner et al. ..................... 403/300 |
| 3,192,622 | 7/1965 | Bannerman ..................... 403/284 X |
| 3,367,102 | 2/1968 | Meger ............................ 403/284 X |
| 3,426,395 | 2/1969 | Sahm ............................ 403/284 X |

Primary Examiner—Wayne L. Shedd
Attorney, Agent, or Firm—Woodling, Krost, Granger & Rust

[57] ABSTRACT

This invention discloses a connector for fiber reinforced plastic wire comprising a metal sleeve for connecting two linear members, at least one of the linear members being fiber reinforced plastic wire, and said metal sleeve being squeezed against said linear members. This invention also discloses a connector for a fiber reinforced plastic wire comprising a metal sleeve which serves as a terminal device mounted on a fiber reinforced plastic wire, said metal sleeve squeezed against said fiber reinforced plastic wire.

10 Claims, 8 Drawing Figures

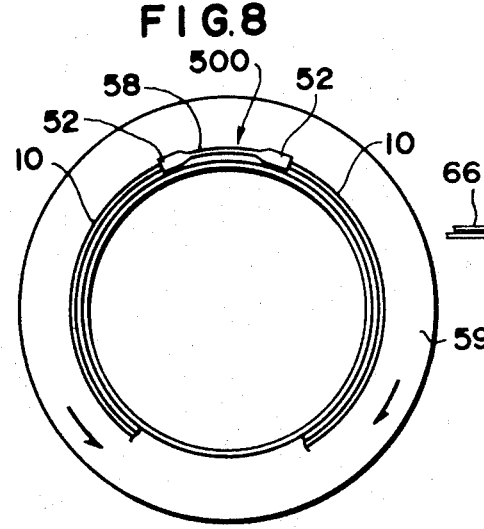
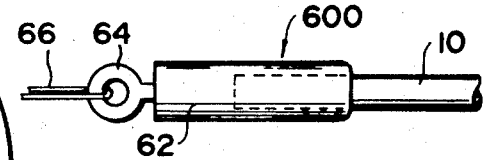
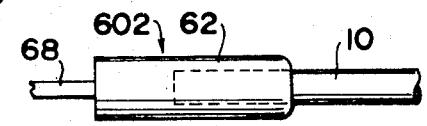
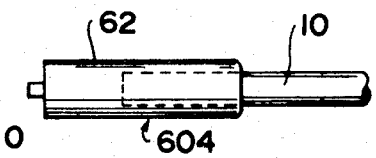
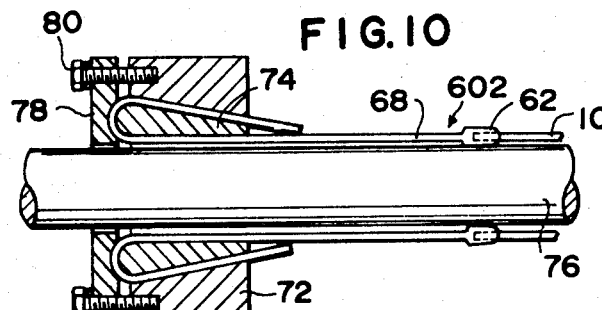
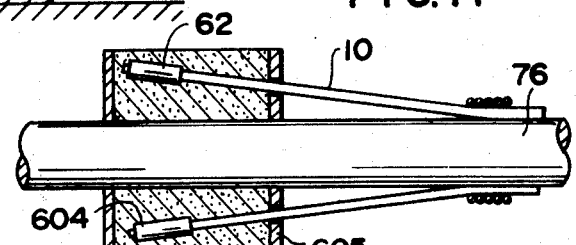
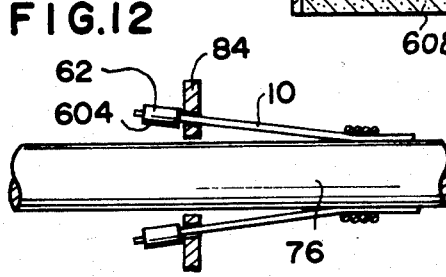

CONNECTOR FOR FIBER REINFORCED PLASTIC WIRE

FIELD OF THE INVENTION

This invention pertains to a connector for a fiber reinforced plastic wire and more particularly to a connector for a fiber reinforced plastic wire suitable for a reinforcing member such as an armoring member, a tensioning member and the like for imparting tensile strength to an elongated member which receives a high tension, such as a power cable, a communication cable and a fluid feeding pipe.

BACKGROUND OF THE INVENTION

In order to improve the mechanical strength of an elongated member such as an electric cable and a fluid feeding pipe, there has been conventionally used a steel wire in the form of armoring member or tensioning member. However, due to the large specific gravity of the steel wire and the resultant heavy weight of the elongated member in which the wire is incorporated, it has been troublesome to carry and lay or install such elongated member. Of late, it has been proposed that the steel wire be replaced by a fiber reinforced plastic wire for reinforcing purposes such as an armoring member, a tensioning member and the like. The fiber reinforced plastic wire is very successful because it has a relatively smaller specific gravity and a relatively larger tensile strength, compared with the steel wire. The greatest disadvantage of the fiber reinforced plastic wire has been that it cannot form a joint having as high tensile strength as welded joint of steel wire. Since the tensile strength of a reinforcing member as a whole depends on that of its joint, the fiber reinforced plastic wire, even though it has a high tensile strength, cannot be used practically for reinforcement if its joint has a lower tensile strength. Conventionally, epoxy resin or cyanide instant adhesive has been used to connect a fiber reinforced plastic wire to another fiber reinforced plastic wire or to a metal wire. In such case the butted faces of the wires are beveled so that they are engaged each other in a relatively larger area and they are covered with and bonded to a sleeve of suitable material by adhesive for improved tensile strength. As a result, the joint of the wires would be undesirably longer. Another disadvantage of such joint is that the cut surfaces must be accurately finished so that they are tightly engaged one another for increased adhesion strength. Further disadvantage is that additional external force must not be applied to the wires to be connected until the adhesive is completely cured, which makes the operation time-consuming. Furthermore, the joint formed by the conventional method in which the two ends are butted together and a FRP sleeve is put and bonded over them, has a large coefficient elasticity and therefore, when used for armoring, must be wound on a cable with a large pitch, thus impairing the flexibility of the cable.

OBJECT OF THE INVENTION

Accordingly, it is a principal object of the present invention to provide a connector for a fiber reinforced plastic wire having a tensile strength approximately equal to that of the wire.

It is another object of the present invention to provide a connector for a fiber reinforced plastic wire adapted to connect linear members in an extremely short time.

It is further object of the present invention to provide a connector for a fiber reinforced plastic wire having a coefficient of bending elasticity approximately equal to that of the fiber reinforced plastic wire members.

SUMMARY OF THE INVENTION

In accordance with one aspect of the invention there is provided a connector for fiber reinforced plastic wire comprising a metal sleeve disposed around and over two linear members to be connected, the end faces of which are butted each other, at least one of the linear members being a fiber reinforced plastic wire member, said metal sleeve having a compressive strength smaller than that of said fiber reinforced plastic wire member and being squeezed in a tight relation to said linear members.

In accordance with another aspect of the present invention, there is provided a connector for fiber reinforced plastic wire member comprising a metal sleeve disposed around one of the ends of a fiber reinforced plastic wire member, said metal sleeve serving as a terminal device, having a compressive strength smaller than that of said fiber reinforced plastic wire member, and being squeezed in a tight relation to said fiber reinforced plastic wire member.

BRIEF DESCRIPTION OF THE DRAWINGS

The above and other objects and features of the present invention will be apparent from the following embodiments described in detail with reference to the accompanying drawings:

FIG. 8 illustrates a fiber reinforced plastic wire having the connector of FIG. 7 and wound around a drum;

FIGS. 9A and 9C are side views of different embodiments of a connector serving as a terminal device;

FIG. 10 is a vertical sectional view of an application of the connector of FIG. 9B; and FIGS. 11 and 12 are vertical sectional views of different applications of the connector of FIG. 9C.

DETAILED DESCRIPTION OF THE PREFERRED EMBODIMENTS OF THE PRESENT INVENTION

Before we describe the embodiments of the present invention, we will define some terms used herein; the term "sleeve" referred to hereinafter is meant for an uncompressed hollow cylindrical body of metal material; the term "connector" referred to hereinafter is meant for the compressed or squeezed sleeve; and the term "joint" referred to hereinafter is meant for such portion of linear members as is connected by the connector.

Figure 1A:
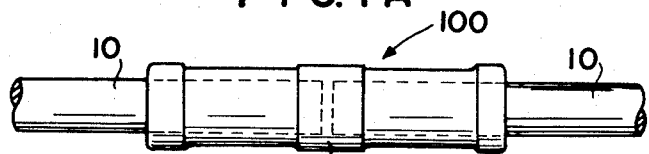
FIG. 1A is a side view of a typical embodiment of a connector for fiber reinforced plastic wire member in accordance with the present invention.
Figure 1B:
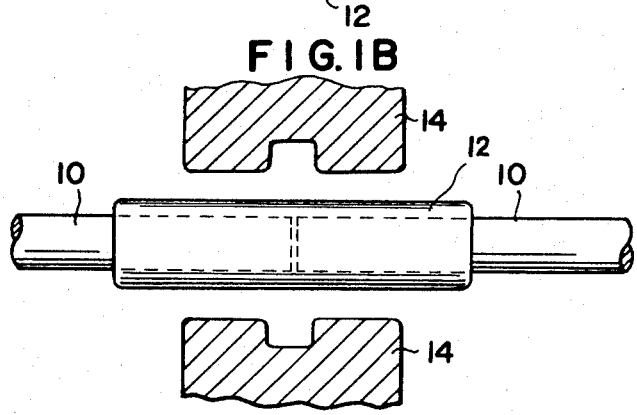
FIG. 1B is a side view of an uncompressed metal sleeve for a connector together with a die to squeeze the metal sleeve.
Figure 1C:
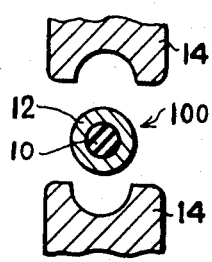
FIG. 1C is a front view of the metal sleeve and the die shown in FIG. 1B.

Referring now to one embodiment shown in FIG. 1, FIGS. 1A and 1C show a connector 100 for connecting two fiber reinforced plastic wire members or rods 10 (sometimes referred to as FRP wire members), which comprise a plurality of rovings formed of elongated fiber strands and bonding synthetic resin with which the rovings are impregnated. The elongated fiber strands include inorganic fiber strands of material such as glass, carbon and stainless steel, organic fiber strands of thermoplastic material such as highly oriented polyolefine, poly-amide, polyester and polycarbonate and compound fiber strands of inorganic and organic materials. The bonding synthetic resin includes thermo-setting resin such as unsaturated polyester, epoxy resin, melamine resin, phenol resin and diallyl phthalate resin and thermoplastic resin such as polyolefine, polyamide, polystyrene, silicone resin, styrene-acrylonitrile copolymer, polyacrylate and polycarbonate. The degree of the bonding synthetic resin impregnation is preferably 15 to 50 percent by weight as against the weight of the rovings. The FRP wire member composed of the rovings bonded together by the synthetic resin in such degree has a smaller specific gravity and a larger tensile and bending strength than the conventional steel rod which has been used for armoring an electric cable. Therefore, the fiber reinforced plastic wires can be used to armor the body of an electric cable by winding them around it with a relatively smaller pitch, thereby improving the flexibility of the cable. Also, the small specific gravity of the rod makes the cable easy to carry and lay it and the large tensile strength of the rod improves the physical strength of the cable. The composition of the fiber reinforced plastic wire is not a part of the present invention and therefore, will not be described in more detail.

The connector 100 of the present invention comprises a hollow cylindrical metal sleeve 12 disposed over the opposing ends of the fiber reinforced plastic wire members to be connected. The metal sleeve is essentially formed of material having a smaller compressive strength than that of the fiber reinforced plastic wire, such as stainless steel, brass, titanium alloy, copper, copper alloy and aluminium alloy. The metal sleeve 12 is squeezed tightly against the FRP wire members 10 by a round die 14 to connect them. The round die 14 squeezes the metal sleeve against the FRP wire members substantially uniformly over the circumference and a majority of the length of the metal sleeve. This makes possible the avoidance of concentration of stress on the circumferential part of the FRP wire members. The round die 14 may comprise two halved sections, each having a semicircular die face, one of which is stationary while the other is movable toward the stationary half by a hydraulic cylinder (not shown). The pressure under which the metal sleeve 12 is squeezed against the FRP wire members 10 must be less than the compressive strength of the FRP wire members and greater than the compressive strength of the metal sleeve. The compressive strength of the metal sleeve being less than those of the FRP wire members and the compressive force given the metal sleeve on its squeezing are the important features of the present invention. The reasons are that if the FRP wire members are buckled by compression, the tensile strength of its joint is extremely decreased and that the pressure applied on the metal sleeve by the hydraulic cylinder must be sufficient to cause plastic deformation of the metal sleeve so that it will tightly adhere to the FRP wire members.

Table I shows a comparison between a joint provided by the connector of the present invention and a joint made by the conventional adhesion method. In this comparison, the FRP wire members were of circular cross section having an outside diameter of 4.5 mm and the metal sleeve used was a stainless steel sleeve having the thickness of 1 mm. The compressive load of the die which deformed the metal sleeve was selected so as to provide a compressive force of less than 47.7 kg/mm$^2$ which was the compressive strength of the FRP wire members and greater than 21 kg/mm$^2$ which was the compressive strength of the metal sleeve. In the joint made by the conventional adhesion method, the butted end faces of the FRP wire members were beveled so as to provide an increased area of contact and bonded together by an adhesive.

Table I

|  | Required length of connection (mm) | Working Time (min.) | Tensile Strength (kg/mm$^2$) |
|---|---|---|---|
| Adhesive | 100 | 15 | 38 |
| Compressed Sleeve | 50 | 3 | 75 |

As seen from the above table, the time required for connection by the present invention was approximately one-fifth of the time required by the prior art because the present invention needs neither finishing of the butted faces nor time-consuming curing of the adhesive. The length of connection required in the present invention was half the connecting length required in the prior art, and yet the tensile strength of the joint obtained was about twice as high, which corresponded to 60 percent of the tensile strength of the fiber reinforced plastic wire.

Figure 3:
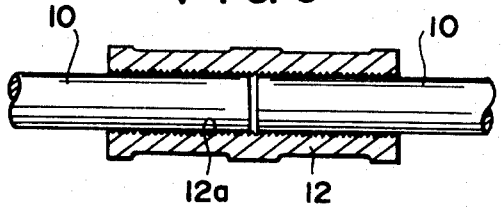
FIG. 3 is a longitudinally sectional view of a connector comprising a modified metal sleeve.

Although FIG. 1 illustrates the embodiment of the connector to connect two fiber reinforced plastic wire members, it should be understood that the present invention may be applied to a connector to connect a fiber reinforced plastic wire member with a rod of metal material such as steel in a similar manner. As illustrated in FIG. 3, the metal sleeve 12 may be preferably provided on the inner periphery with serrations 12a to increase the drawing force of the fiber reinforced plastics wire and/or the metal rod. Although not shown the metal sleeve 12 may be preferably coated or covered with anti-corrosive material in case the fiber reinforced plastic wire is used as armoring member for a submarine cable in a corrosive atmosphere. The anti-corrosive material may include paint, rubbers and plastics which may be applied by means of painting, bonding, covering and so on. The metal sleeve may be squeezed after being covered with the anti-corrosive material.

Figure 4:
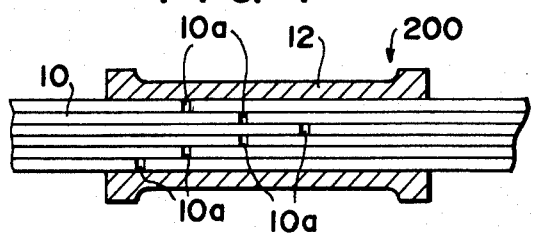
FIG. 4 is a longitudinally sectional view of a connector for fiber reinforced plastic wire with the butted ends of the linear members being arranged at different points.

Referring now to FIG. 4, there is illustrated a modified connector 200 of the present invention wherein the fiber reinforced plastic wire members comprise a bundle of fine wire elements, the butted faces 10a of which may be arranged in a staggered manner. The said connector has a tensile strength about 20 to 30 percent greater than that of a connector in which the butted faces of the fine wire elements are on the same cross-sectional plane.

Figure 2A:
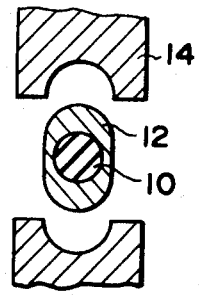
FIG. 2A is similar to FIG. 1C, but shows a metal sleeve having a configuration different from that of the metal sleeve of FIG. 1C.
Figure 2B:
FIG. 2B is a cross section view of connector constructed of the metal sleeve of FIG. 2A.
Figure 5:
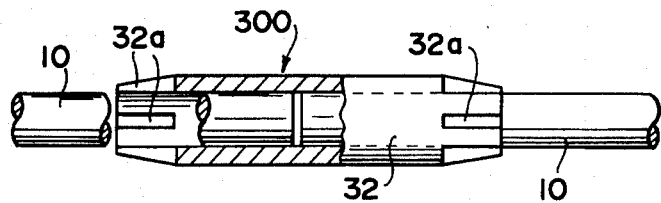
FIG. 5 is a side view of a connector having a further modified metal sleeve with a portion of the sleeve broken away.

FIG. 5 shows still another modified connector 300 of the present invention, which may comprise a metal sleeve 32 each having a plurality of axial slits 32a provided on both ends. The metal sleeve may be tapered at their slitted portions so that they gradually decrease in thickness toward their ends. The FRP wire members 10 are connected by squeezing the metal sleeve 12 in the same manner as described in connection with FIGS. 1 and 2. In case the FRP wire with this connector is, for example, wound on a drum, the end portions of the metal sleeve 32 flex and the bending rigidity of the wire adjacent to the joint changes continuously, thereby preventing breakage of the wire which would otherwise be caused by a sharp bend.

Figure 6A:
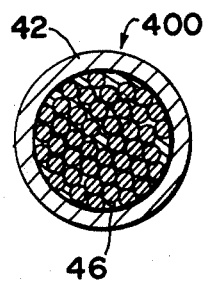
FIGS. 6A and 6B are a cross sectional view and a longitudinally sectional view, respectively of a connector with a filler.
Figure 6B:
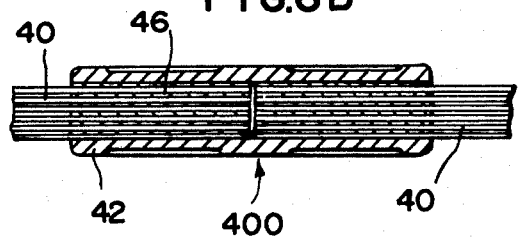

Referring now to FIG. 6, there is illustrated a connector 400 to connect two bundles 40 of FRP wire elements to each other. The connector may comprise a metal sleeve 42 substantially identical to the one shown in FIG. 1, but the bundles at the connecting ends thereof are solidified by filler 46. The filler may be a blend of thermosetting resin such as epoxy resin and powder of glass, quartz, or glass fiber. Since the filler is fed in the gaps between the FRP wire elements, the compressed metal sleeve 42 can be engaged against the fiber reinforced plastic wire bundles 40 in the relatively larger area and the fine wire elements are engaged each other also in the same manner. If there is no filler in the bundles, then when the tension is applied to the wires 40 the stress is concentrated on a part of the fine wire elements so that the fiber reinforced wire is broken under compression. With the construction of FIG. 6 the larger area of contact of the metal sleeve 42 improves the tensile strength of the connector. The filler also serves to uniformly distribute in the interior of the bundles of fiber reinforced plastic wires the pressure under which the metal sleeve 42 is squeezed. By way of example, a joint was made in which two bundles of 1.5 mm-diameter FRP wires, each bundle being composed of seven lengths of such wire, were connected to each other with a stainless steel sleeve having a wall thickness of 1 mm, compressed with a force of 30 kg/mm$^2$, and another joint was made in which the same bundles of FRP wires were filled with a compound of 100 parts of epoxy resin and 200 parts of quartz powder and then connected to each other with the same stainless steel sleeve with the same force as in the justabove-mentioned joint. When pulling force was given the two joints, the latter remained unbroken even when the force was increased to 900 kg while the former was broken at 500 kg.

Figure 7:
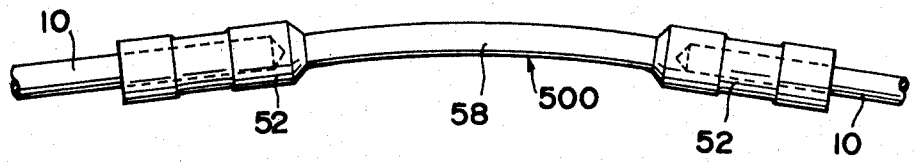
FIG. 7 is a side view of a flexible connector in accordance with the present invention.

Referring now to FIG. 7, there is illustrated a flexible connector arrangement 500 which comprises two sleeves 52 integral with both ends of a flexible metal rod 58. The FRP wire members 10 at the ends are connected by compressing the respective sleeves 52 in the same manner as described in connection with FIG. 1. It will be understood that the connector of FIG. 7 is more flexible than that of FIG. 5. Accordingly, as shown in FIG. 8, where the fiber reinforced plastic wire having the connector of FIG. 7 is wound around a drum 59, the connector 500 can be bent in the substantially same curvature as the wire without any concentration of stress on the sleeve 52, resulting in preventing the connector from its breaking. By way of example, two fiber reinforced plastic wire members each having the diameter of 4 mm were connected by the connector of FIG. 1 and the connector of FIG. 7, respectively as shown in the following Table II.

Table II

|  | The connector of Fig. 7 | The connector of Fig. 1 |
| --- | --- | --- |
| Material | SUS27 | SUS27 |
| Length of Compressed Portion | 20 mm | 20 mm |
| Length of Sleeve | 30 mm | 66 mm |
| Length of Flexible Metal Rod | 200 mm | — |
| Outside Diameter of Flexible Metal Rod | 4 mm | — |

When some samples of the respective fiber reinforced plastic wires having the above types of the connectors were wound around reels having the diameter of 400 mm and given a load in the direction of the arrows in FIG. 8 for 100 hours, three of five samples of the connector of FIG. 1 were broken while all the samples of the connector of FIG. 7 remained unbroken. Thus, it will be noted that the fiber reinforced plastic wire having the connector of FIG. 7 is more suitable for cable armoring than that having the connector of FIG. 7.

Although the FRP wire members 10 of FIGS. 1, 3, 5 and 7 comprise a single thick wire element, it will be understood that they may comprise a bundle of fiber reinforced plastic fine wire elements in the same manner as shown in FIGS. 4 and 6.

Referring now to FIG. 9, there are connectors 600 to 604 comprising metal sleeves 62 serving also as terminal devices. Each of the sleeves is connected to a single fiber reinforced plastic wire 10 in the same manner as described in connection with FIG. 1. The connector 600 of FIG. 9A includes an eye 64 integral with the metal sleeve 62 and having a lead wire 66 connected thereto by any suitable means. The connector 602 of FIG. 9B has a flexible lead wire or rod 68 connected thereto and integral therewith. The connector 604 of FIG. 9C is designed so that the metal sleeve 62 serves as a head of the fiber reinforced plastic wire 10.

FIG. 10 illustrates a cable anchoring device for an armored cable which comprises an anchor metal 72 fixed to a structure 70 by any suitable means and having a tapered opening and an annular wedge metal 74 placed into engagement with the wall of the tapered opening in the anchor metal 72. The armor of fiber reinforced plastic wire on the cable 76 is removed at the end and the armorless part of the cable is passed through the annular wedge metal 74. The armoring FRP wires on the cable are connected to connectors 602 of FIG. 9B whose flexible lead wires 68 are passed through the annular wedge metal 74 and then turned back on the outside thereof and held securely between the wedge metal 74 and the anchor metal 72. An annular tightening metal 78 is tightened against the wedge metal 74 and secured to the anchor metal 72 by bolts 80 so that the turned portions of the lead wires 68 are held between the metals 74 and 78. The bolts 80 extend through the tightening metal 78 and are screwed into the anchor metal 72.

FIGS. 11 and 12 also illustrate other anchoring devices for FRP armored cable and the same reference numerals designate the same components as shown in FIG. 10. The anchor devices each comprises a head and connector 604 of FIG. 9C secured to each of the ends of the armoring FRP wires. In the anchoring device of FIG. 11 the FRP wires 10 including the connector 604 are placed within an annular housing 605 through which the body of the cable 76 extends, with the wires extending through one of the end walls of the housing. The housing 605 is filled with thermo-setting resin 608 such as epoxy resin. The resin may preferably have an additive such as quartz powder providing the increased compressive strength thereto. Because of the connectors 604 rigid to the housing 605 by means of the resin 608 filled in the housing, the FRP wires 10 are secured to the housing 605. The anchoring device of FIG. 12 is shown to have the head and connector 604 engaged against the anchor metal 84 on the outer surface.

While some preferred embodiments of the present invention have been illustrated and described with reference to the accompanying drawings, it will be apparent to those skilled in the art that various modifications and changes in arrangement and construction might be made without departing from the spirit and scope of the present invention, which is intended to be limited only to the appended claims.

What is claimed is:

1. A connector for a fiber reinforced plastic wire comprising a metal sleeve disposed around and squeezed in a tight relation to an end of at least one fiber reinforced plastic wire member, said metal sleeve having a compressive strength less than that of said fiber reinforced plastic wire member, characterized by that said sleeve is circumferentially continuous from end-to-end and is permanently deformed into substantially uniform squeezing engagement with said fiber reinforced plastic wire member over the circumference and a majority of the length of said metal sleeve with a compressive force less than the compressive strength of said fiber reinforced plastic wire member and greater than that of said metal sleeve, whereby said fiber reinforced plastic wire member is not buckled.

2. A connector as set forth in claim 1, wherein said metal sleeve has a flexible metal wire integral therewith.

3. A connector as set forth in claim 1, wherein said metal sleeve serves as a terminal device.

4. A connector for fiber reinforced plastic wire, comprising a metal sleeve disposed around and squeezed in a tight relation to at least one fiber reinforced plastic wire member having a joint connected by said metal sleeve, said metal sleeve having a compressive strength less than that of said fiber reinforced plastic wire member, characterized by that said sleeve is circumferentially continuous from end-to-end and is permanently deformed into substantially uniform squeezing engagement with said fiber reinforced plastic wire member over the circumference and a majority of the length of said metal sleeve with a compressive force less than the compressive strength of said fiber reinforced plastic wire member and greater than that of said metal sleeve, whereby said fiber reinforced plastic wire member is not buckled.

5. A connector as set forth in claim 4, wherein said metal sleeve has serrations provided on the inner surface thereof.

6. A connector for a fiber reinforced plastic wire, comprising a metal sleeve disposed around and over two linear members with the end faces thereof butted to each other for connection, at least one of said linear members being a fiber reinforced plastic wire member, said metal sleeve being squeezed in a tight relation to said linear members each having a joint connected by said metal sleeve and said metal sleeve having a compressive strength less than that of said fiber reinforced plastic wire member, characterized by that said sleeve is circumferentially continuous from end-to-end and is permanently deformed into substantially uniform squeezing engagement with said fiber reinforced plastic wire member over the circumference and a majority of the length of said metal sleeve with a compressive force less than the compressive strength of said fiber reinforced plastic wire member and greater than that of said metal sleeve, whereby said fiber reinforced plastic wire member is not buckled.

7. A connector for fiber reinforced plastic wire, comprising a metal sleeve disposed around and squeezed in a tight relation to a fiber reinforced plastic wire member having a joint connected by said metal sleeve and said metal sleeve having a compressive strength less than that of said fiber reinforced plastic wire member, characterized by that said sleeve is circumferentially continuous from end-to-end and is permanently deformed into substantially uniform squeezing engagement with said fiber reinforced plastic wire member over the circumference and a majority of the length of said metal sleeve with a compressive force less than the compressive strength of said fiber reinforced plastic wire member and greater than that of said metal sleeve, whereby said fiber reinforced plastic wire member is not buckled, and that said metal sleeve serves as a terminal device.

8. A connector as set forth in claim 7, wherein said metal sleeve has a flexible metal wire integral therewith.

9. An arrangement of connectors for fiber reinforced plastic wire, said connectors comprising two metal sleeves and said metal sleeves of said connectors being disposed around and squeezed in a tight relation to the ends of two linear members to be connected respectively, at least one of said linear members being a fiber reinforced plastic wire member and said metal sleeve having a compressive strength less than that of said fiber reinforced plastic wire member, characterized by that said sleeves are circumferentially continuous from end-to-end and at least one sleeve is permanently deformed into substantially uniform squeezing engagement with said fiber reinforced plastic wire member over the circumference and a majority of the length of said one sleeve with a compressive force less than the compressive strength of said fiber reinforced plastic wire member and greater than that of said metal sleeve, whereby said fiber reinforced plastic wire member is not buckled, and that said two metal sleeves are connected to each other by a flexible metal rod integral therewith.

10. A connector for fiber reinforced plastic wire, comprising a metal sleeve disposed around and over two linear members with the end faces thereof butted to each other for connection, said linear members being fiber reinforced plastic wire members each comprising a bundle of fiber reinforced plastic find wire elements and the sleeve being squeezed in a tight relation to said linear members each having a joint connected by said metal sleeve, said metal sleeve having a compressive strength less than that of said fiber reinforced plastic wire members, characterized by that said sleeve is circumferentially continuous from end-to-end and is permanently deformed into substantially uniform squeezing engagement with said fiber reinforced plastic wire member over the circumference and a majority of the length of said metal sleeve with a compressive force less than the compressive strength of said fiber reinforced wire members and greater than that of said metal sleeve, whereby said fiber reinforced plastic wire member is not buckled, and that the gaps between said fiber reinforced plastic wire elements over which said metal sleeve is disposed are filled with filler.

* * * * *